United States Patent
Penn, II et al.

(10) Patent No.: US 9,476,626 B2
(45) Date of Patent: Oct. 25, 2016

(54) VARIABLE SPEED COMPRESSOR CONTROL WITH LOST ROTOR MITIGATION

(71) Applicant: Emerson Climate Technologies, Inc., Sidney, OH (US)

(72) Inventors: Wayne M. Penn, II, Troy, OH (US); Jacob A. Groshek, Troy, OH (US); Simon David Hart, Welshpool (GB)

(73) Assignee: Emerson Climate Technologies, Inc., Sidney, OH (US)

( * ) Notice: Subject to any disclaimer, the term of this patent is extended or adjusted under 35 U.S.C. 154(b) by 0 days.

(21) Appl. No.: 14/838,071

(22) Filed: Aug. 27, 2015

(65) Prior Publication Data

US 2016/0061507 A1  Mar. 3, 2016

Related U.S. Application Data

(60) Provisional application No. 62/044,062, filed on Aug. 29, 2014.

(51) Int. Cl.
| | | |
|---|---|---|
| *H02P 7/00* | (2016.01) | |
| *F25B 49/02* | (2006.01) | |
| *H02P 21/14* | (2016.01) | |
| *H02P 29/02* | (2016.01) | |

(52) U.S. Cl.
CPC .......... *F25B 49/025* (2013.01); *F25B 49/022* (2013.01); *H02P 21/146* (2013.01); *H02P 29/024* (2013.01); *H02P 29/028* (2013.01)

(58) Field of Classification Search
CPC ...... H02P 21/146; H02P 6/04; F04B 49/103; F25B 49/022; F25B 49/025
USPC ......... 318/461, 400.03, 400.04, 400.06, 722, 318/268
See application file for complete search history.

(56) References Cited

U.S. PATENT DOCUMENTS

| | | | | |
|---|---|---|---|---|
| 4,734,628 A | | 3/1988 | Bench et al. | |
| 5,996,343 A | * | 12/1999 | Kuras | F16H 47/04 60/448 |
| 6,034,493 A | * | 3/2000 | Boyd | H02P 6/182 318/400.31 |
| 6,278,931 B1 | * | 8/2001 | Crawford | B60K 31/047 180/170 |

(Continued)

OTHER PUBLICATIONS

International Search Report regarding International Application No. PCT/US2015/047470, dated Nov. 27, 2015.

(Continued)

*Primary Examiner* — Bentsu Ro
*Assistant Examiner* — Thai Dinh
(74) *Attorney, Agent, or Firm* — Harness, Dickey & Pierce, P.L.C.

(57) ABSTRACT

A drive controller for a motor of a compressor includes a drive circuit that applies voltages to windings of the motor. A speed control module controls the drive circuit to rotate the motor at a requested speed. A speed determination module generates the requested speed based on a speed demand from a system controller. A lost rotor control module identifies a lost rotor condition and, in response to identifying the lost rotor condition, instructs the speed determination module to set the requested speed to an override speed that is lower than the speed demand. The lost rotor control module identifies the lost rotor condition in response to a comparison of a speed error with an adaptive threshold. The speed error is based on a difference between requested and estimated speeds of the motor. During first and second system states, the adaptive threshold is set to first and second thresholds, respectively.

20 Claims, 13 Drawing Sheets

(56) References Cited

U.S. PATENT DOCUMENTS

| | | |
|---|---|---|
| 6,381,791 B1 | 5/2002 | French et al. |
| 7,102,309 B2 | 9/2006 | Oh et al. |
| 7,233,854 B2 * | 6/2007 | Rayl ................... F02D 41/0087 123/352 |
| 8,084,976 B2 | 12/2011 | Hashimoto |
| 8,378,605 B2 * | 2/2013 | Wang ..................... F04B 17/03 318/400.01 |
| 2013/0234639 A1 | 9/2013 | Henderson et al. |

OTHER PUBLICATIONS

Written Opinion of the International Searching Authority regarding International Application No. PCT/US2015/047470, dated Nov. 27, 2015.

* cited by examiner

VARIABLE SPEED COMPRESSOR CONTROL WITH LOST ROTOR MITIGATION

CROSS-REFERENCE TO RELATED APPLICATIONS

This application claims the benefit of U.S. Provisional Application No. 62/044,062, filed on Aug. 29, 2014. The entire disclosure of the application referenced above is incorporated herein by reference.

FIELD

The present disclosure relates to heating ventilation and air/conditioning (HVAC) and more particularly to control of a variable speed compressor.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In FIG. 1, a functional block diagram of a refrigeration system is presented. The refrigeration system includes a compressor 102, a condenser 104, an expansion valve 106, and an evaporator 108. The compressor 102 receives refrigerant in vapor form and compresses the refrigerant, providing pressurized refrigerant in vapor form to the condenser 104. The compressor 102 includes an electric motor and may be a scroll compressor or a reciprocating compressor.

All or a portion of the pressurized refrigerant is converted into liquid form within the condenser 104. The condenser 104 transfers heat away from the refrigerant, thereby cooling the refrigerant. When the refrigerant vapor is cooled to a temperature that is less than a saturation temperature, the refrigerant transforms into a liquid (or liquefied) refrigerant. The condenser 104 may include an electric fan that increases the rate of heat transfer away from the refrigerant.

The condenser 104 provides the refrigerant to the evaporator 108 via the expansion valve 106. The expansion valve 106 controls the flow rate at which the refrigerant is supplied to the evaporator 108. The expansion valve 106 may include a thermostatic expansion valve or may be controlled electronically by, for example, a system controller 130. A pressure drop caused by the expansion valve 106 may cause a portion of the liquefied refrigerant to transform back into the vapor form. In this manner, the evaporator 108 may receive a mixture of refrigerant vapor and liquefied refrigerant.

The refrigerant absorbs heat in the evaporator 108. Liquid refrigerant transitions into vapor form when warmed to a temperature that is greater than the saturation temperature of the refrigerant. The evaporator 108 may include an electric fan that increases the rate of heat transfer to the refrigerant. The heat is removed from air flowing across the evaporator 108 and the resulting cooled air is circulated through the building.

A utility 120 provides power to the refrigeration system. For example only, the utility 120 may provide single-phase alternating current (AC) power at approximately 230 Volts (V) root mean squared (RMS) or at another suitable voltage. In various implementations, the utility 120 may provide three-phase power at approximately 400 Volts RMS or 480 Volts RMS at a line frequency of, for example, 50 or 60 Hz. The utility 120 may provide the AC power to the system controller 130 via an AC line. The AC power may also be provided to a drive controller 132 via the AC line. In other implementations, the utility 120 may supply direct current (DC) power.

The system controller 130 controls the refrigeration system. For example only, the system controller 130 may control the refrigeration system based on user inputs and/or parameters measured by various sensors (not shown). The sensors may include pressure sensors, temperature sensors, current sensors, voltage sensors, etc. The sensors may also include feedback information from the drive controller 132, such as motor currents or torque, over a serial data bus or other suitable data bus.

A user interface 134 provides user inputs to the system controller 130. The user interface 134 may additionally or alternatively provide the user inputs to the drive controller 132. The user inputs may include, for example, a desired temperature, requests regarding operation of a fan (e.g., the evaporator fan), and/or other suitable inputs. The system controller 130 may control operation of the fan of the condenser 104, the fan of the evaporator 108, and/or the expansion valve 106. In various implementations, the drive controller 132 may instead control the condenser fan.

The drive controller 132 may control the compressor 102 based on commands from the system controller 130. For example only, the system controller 130 may instruct the drive controller 132 to operate the compressor motor at a certain speed.

In FIG. 2, a simplified schematic of the drive controller 132 is shown. The drive controller 132 includes control logic 200 that controls a drive circuit 204. The drive circuit 204 produces potentials and currents on phases of a motor 208 of the compressor 102. The motor 208 includes first, second and third windings 212-1, 212-2, and 212-3, referred to as windings A, B, and C, respectively. Although pictured in a Y configuration, the motor 208 may also be wired using a delta configuration.

The drive circuit 204 includes an input bridge 220, which converts incoming AC voltage into a DC voltage output on a DC bus 224. The DC bus 224 powers an inverter stage 228, which switches the DC bus to apply potentials to the windings 212 of the motor 208. The input bridge 220 in this example includes rectifying diodes 232-1, 232-2, and 232-3, as well as rectifying diodes 236-1, 236-2, and 236-3. In this example, the incoming AC power is 3-phase and therefore 3 pairs of rectifying diodes are used. In other implementations, the input bridge 220 may include a controlled rectifier.

The DC bus 224 may include one or more capacitors 240 to remove voltage ripple. While not shown in this example, the input bridge 220 may also include power factor correction components that actively and/or passively improve the power factor of the input bridge 220.

Additional components 244 for inrush limiting and inductance may be present. Inrush limiting may include a resistor that can be bypassed during normal operation. During startup, the resistor is not bypassed and therefore reduces the amount of current being pulled from the AC line when the capacitor 240 is first being charged. An inductor placed in series may also limit inrush current and may be configured not to be bypassed so that the inductor can limit fault current during normal operation. In addition, the inductor may smooth the voltage of the DC bus 224. Additionally, or alternatively, inrush control may be implemented in the positive line 224 or may be implemented between the 3-phase AC line and the input bridge 220.

The inverter stage 228 includes switches 250-1, 250-2, 250-3, 254-1, 254-2, and 254-3. There are three pairs of switches 250 and 254, with each pair corresponding to one of the motor windings 212. The node at the connection point of each pair of switches 250 and 254 is attached to a corresponding one of the motor windings 212. The switches 250 and 254 may include transistors and in some implementations may be insulated gate bipolar junction transistors (IGBTs). As shown, the switches 250 and 254 may be N channel, but in other implementations are P channel or a combination of both N channel and P channel. Across each of the switches 250 and 254 is a diode connected antiparallel. Specifically, diodes 258-1, 258-2, 258-3, 262-1, 262-2, and 262-3 are connected to the switches 250-1, 250-2, 250-3, 254-1, 254-2, and 254-3, respectively. In various implementations, anti-parallel diodes may be included within a single package with one or more IGBTs.

Control terminals of the switches 250 and 254 are manipulated by the control logic 200. The control logic 200 interfaces with the system controller 130 of FIG. 1. The control logic 200 may also measure currents and voltages from the inverter stage 228 and/or the motor 208. For example, back electromotive force (BEMF) from the windings 212 of the motor may be measured or calculated. The control logic 200 may control the switches 250 and 254 using pulse-width modulation to apply varying voltages to the windings 212 of the motor 208. The switches 250 and 254 may generally be controlled inversely—that is, while switch 250-1 is turned on, switch 254-1 will be turned off, and vice versa.

SUMMARY

A drive controller for a motor of a compressor includes a drive circuit that applies voltages to windings of the motor; a speed control module that controls the drive circuit to rotate the motor at a requested speed; a speed determination module that generates the requested speed; and a defrost module that enables a defrost mode in response to a defrost command. While the defrost mode is enabled, the defrost module causes the speed determination module to (i) ramp the requested speed down from a speed demand to a defrost speed and (ii) maintain the requested speed at the defrost speed for a predetermined period of time.

In other features, upon expiration of the predetermined period of time, the defrost module causes the speed determination module to ramp the requested speed up to the speed demand. In other features, the defrost command is received from a system controller. In other features, the system controller provides the speed demand to the drive controller. In other features, the system controller actuates a reversing valve corresponding to the compressor while the defrost mode is enabled.

In other features, the defrost speed is set according to a programmed value. In other features, the programmed value corresponds to a speed chosen to produce a low level of audible noise in the compressor. In other features, the defrost speed is set to the greater of (i) the programmed value and (ii) a lower threshold. In other features, the lower threshold is 1500 rpm, the predetermined period of time is 60 seconds, the defrost module causes the speed determination module to ramp the requested speed down from the speed demand to the defrost speed at a ramp rate of 500 rpm per second, and the defrost module causes the speed determination module to ramp the requested speed up to the speed demand at a ramp rate of 500 rpm per second.

In other features, the drive controller includes an envelope determination module that stores an operational envelope for the compressor. In other features, the operational envelope specifies a range of acceptable speeds for varying operating conditions of the compressor. In other features, the envelope determination module determines a minimum speed corresponding to present operating conditions of the compressor. In other features, the defrost speed is set to the greater of (i) the programmed value and (ii) the minimum speed. In other features, the operating conditions include (i) a refrigerant pressure at a condenser in fluid communication with the compressor and (ii) a refrigerant pressure at an evaporator in fluid communication with the compressor.

A method of operating a drive controller for a motor of a compressor includes applying voltages to windings of the motor; controlling the voltages to rotate the motor at a requested speed; selectively enabling a defrost mode in response to a defrost command; and while the defrost mode is enabled, (i) ramping the requested speed down from a speed demand to a defrost speed and (ii) maintaining the requested speed at the defrost speed for a predetermined period of time.

In other features, the method further includes, upon expiration of the predetermined period of time, ramping the requested speed up to the speed demand. In other features, the defrost command is received from a system controller. In other features, the method further includes receiving the speed demand from the system controller. In other features, the system controller actuates a reversing valve corresponding to the compressor while the defrost mode is enabled.

In other features, the method further includes setting the defrost speed according to a programmed value. In other features, the programmed value corresponds to a speed chosen to produce a low level of audible noise in the compressor. In other features, the setting the defrost speed includes setting the defrost speed to the greater of (i) the programmed value and (ii) a lower threshold. In other features, the lower threshold is 1500 rpm, the predetermined period of time is 60 seconds, the ramping the requested speed down from the speed demand to the defrost speed is performed at a ramp rate of 500 rpm per second, and the ramping the requested speed up to the speed demand is performed at a ramp rate of 500 rpm per second.

In other features, the method further includes storing an operational envelope for the compressor. In other features, the operational envelope specifies a range of acceptable speeds for varying operating conditions of the compressor. In other features, the method further includes determining a minimum speed from the stored operational envelope according to present operating conditions of the compressor. In other features, the setting the defrost speed includes setting the defrost speed to the greater of (i) the programmed value and (ii) the minimum speed. In other features, the operating conditions include (i) a refrigerant pressure at a condenser in fluid communication with the compressor and (ii) a refrigerant pressure at an evaporator in fluid communication with the compressor.

A drive controller for a motor of a compressor includes a drive circuit that applies voltages to windings of the motor; a speed control module that controls the drive circuit to rotate the motor at a requested speed; a speed determination module that generates the requested speed; and a locked rotor protection module that identifies a locked rotor condition and, in response to identifying the locked rotor condition, instructs the speed determination module to power down the motor. The locked rotor protection module acquires an estimated speed of the motor upon expiration of a predetermined time interval that begins upon startup of the motor. The locked rotor protection module identifies the locked rotor condition in response to the estimated speed being lower than a threshold speed. The threshold speed is based on the requested speed.

In other features, the threshold speed is a predetermined percentage of the requested speed. In other features, the predetermined percentage is 20 percent. In other features, the threshold speed and the predetermined time interval are programmed so that presence of liquid refrigerant in the compressor upon startup of the motor is not identified as the locked rotor condition. In other features, the locked rotor protection module initiates heating of the compressor in response to identifying the locked rotor condition. In other features, the locked rotor protection module increments a counter in response to identifying the locked rotor condition.

In other features, the locked rotor protection module permits the motor to be automatically restarted after a predetermined delay following identification of the locked rotor condition. In other features, the locked rotor protection module prevents the motor from being automatically restarted in response to the counter reaching a predetermined threshold. In other features, the locked rotor protection module clears the counter in response to the estimated speed being greater than the threshold speed.

In other features, the drive controller further includes a startup module that starts the motor by (i) causing the speed determination module to ramp the requested speed from zero up to a predetermined dwell speed and (ii) causing the speed determination module to maintain the requested speed at the predetermined dwell speed for a predetermined dwell time period. In other features, the locked rotor protection module acquires the estimated speed of the motor upon the earlier of (i) expiration of the predetermined time interval or (ii) a beginning of the predetermined dwell time period. In other features, the predetermined time interval is 12 seconds, the predetermined dwell speed is 3600 rpm, the predetermined dwell time period is 120 seconds, the speed determination module ramps the requested speed from zero up to the predetermined dwell speed at 1000 rpm per second, and the threshold speed is 20 percent of the requested speed.

A method of operating a drive controller for a motor of a compressor includes applying voltages to windings of the motor; controlling the voltages to rotate the motor at a requested speed; acquiring an estimated speed of the motor upon expiration of a predetermined time interval that begins upon startup of the motor; selectively identifying a locked rotor condition in response to the estimated speed being lower than a threshold speed; and, in response to identifying the locked rotor condition, powering down the motor. The threshold speed is based on the requested speed.

In other features, the threshold speed is a predetermined percentage of the requested speed. In other features, the predetermined percentage is 20 percent. In other features, the threshold speed and the predetermined time interval are programmed so that presence of liquid refrigerant in the compressor upon startup of the motor is not identified as the locked rotor condition. In other features, the method further includes initiating heating of the compressor in response to identifying the locked rotor condition. In other features, the method further includes incrementing a counter in response to identifying the locked rotor condition. In other features, the method further includes automatically restarting the motor after a predetermined delay following identification of the locked rotor condition. In other features, the method further includes preventing automatic restarting of the motor in response to the counter reaching a predetermined threshold.

In other features, the method further includes clearing the counter in response to the estimated speed being greater than the threshold speed. In other features, the method further includes starting the motor by (i) ramping the requested speed from zero up to a predetermined dwell speed and (ii) maintaining the requested speed at the predetermined dwell speed for a predetermined dwell time period. In other features, the acquiring includes acquiring the estimated speed of the motor upon the earlier of (i) expiration of the predetermined time interval or (ii) a beginning of the predetermined dwell time period. In other features, the predetermined time interval is 12 seconds, the predetermined dwell speed is 3600 rpm, the predetermined dwell time period is 120 seconds, the ramping the requested speed from zero up to the predetermined dwell speed is performed at 1000 rpm per second, and the threshold speed is 20 percent of the requested speed.

A drive controller for a motor of a compressor includes a drive circuit that applies voltages to windings of the motor; a speed control module that controls the drive circuit to rotate the motor at a requested speed; a speed determination module that generates the requested speed based on a speed demand from a system controller; and a lost rotor control module that identifies a lost rotor condition and, in response to identifying the lost rotor condition, instructs the speed determination module to set the requested speed to an override speed that is lower than the speed demand. The lost rotor control module identifies the lost rotor condition in response to a comparison of a speed error with an adaptive threshold. The speed error is based on a difference between the requested speed and an estimated speed of the motor. During a first system state, the adaptive threshold is equal to a first threshold. During a second system state, the adaptive threshold is equal to a second threshold.

In other features, the first system state corresponds to a dynamic period of the requested speed. In other features, the second system state corresponds to a stable period of the requested speed. In other features, the first system state and the second system state are mutually exclusive. In other features, the first threshold is greater than the second threshold. In other features, the lost rotor control module identifies the first system state in response to a variation in the requested speed being less than a predetermined amount over a preceding predetermined time period. In other features, the predetermined amount is based on a percentage of the requested speed, the first threshold is thirty percent, and the second threshold is twenty percent.

In other features, the lost rotor control module resets a detector timer in response to the speed error being below the adaptive threshold. In other features, the lost rotor control module identifies the lost rotor condition in response to the detector timer exceeding a predetermined threshold period. In other features, the lost rotor control module decreases the override speed by a predetermined increment in response to each additional identification of the lost rotor condition. In other features, the lost rotor control module disables the motor in response to the override speed decreasing below a minimum operating speed.

In other features, the drive controller further includes an envelope determination module that determines the minimum operating speed based on (i) a refrigerant pressure at a condenser in fluid communication with the compressor and (ii) a refrigerant pressure at an evaporator in fluid communication with the compressor. In other features, while the speed determination module is setting the requested speed to the override speed, the lost rotor control module increases the override speed by a predetermined increment for each predetermined dwell time period during which the lost rotor condition is not identified. In other features, in response to the override speed reaching the speed demand, the lost rotor control module instructs the speed determination module to resume generating the requested speed based on the speed demand.

A method of operating a drive controller for a motor of a compressor includes applying voltages to windings of the motor; controlling the voltages to rotate the motor at a requested speed; generating the requested speed based on a speed demand from a system controller; selectively identifying a lost rotor condition in response to a comparison of a speed error with an adaptive threshold; and, in response to identifying the lost rotor condition, setting the requested speed to an override speed that is lower than the speed demand. The speed error is based on a difference between the requested speed and an estimated speed of the motor. During a first system state, the adaptive threshold is equal to a first threshold. During a second system state, the adaptive threshold is equal to a second threshold.

In other features, the first system state corresponds to a dynamic period of the requested speed. In other features, the second system state corresponds to a stable period of the requested speed. In other features, the first system state and the second system state are mutually exclusive. In other features, the first threshold is greater than the second threshold. In other features, the method further includes identifying the first system state in response to a variation in the requested speed being less than a predetermined amount over a preceding predetermined time period.

In other features, the predetermined amount is based on a percentage of the requested speed, the first threshold is thirty percent, and the second threshold is twenty percent. In other features, the method further includes resetting a detector timer in response to the speed error being below the adaptive threshold. In other features, the lost rotor condition is identified in response to the detector timer exceeding a predetermined threshold period. In other features, the method further includes decreasing the override speed by a predetermined increment in response to each additional identification of the lost rotor condition.

In other features, the method further includes disabling the motor in response to the override speed decreasing below a minimum operating speed. In other features, the method further includes determining the minimum operating speed based on (i) a refrigerant pressure at a condenser in fluid communication with the compressor and (ii) a refrigerant pressure at an evaporator in fluid communication with the compressor. In other features, the method further includes, while the requested speed is set to the override speed, increasing the override speed by a predetermined increment for each predetermined dwell time period during which the lost rotor condition is not identified. In other features, the method further includes, in response to the override speed reaching the speed demand, resuming generation of the requested speed based on the speed demand.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Figure 3A:
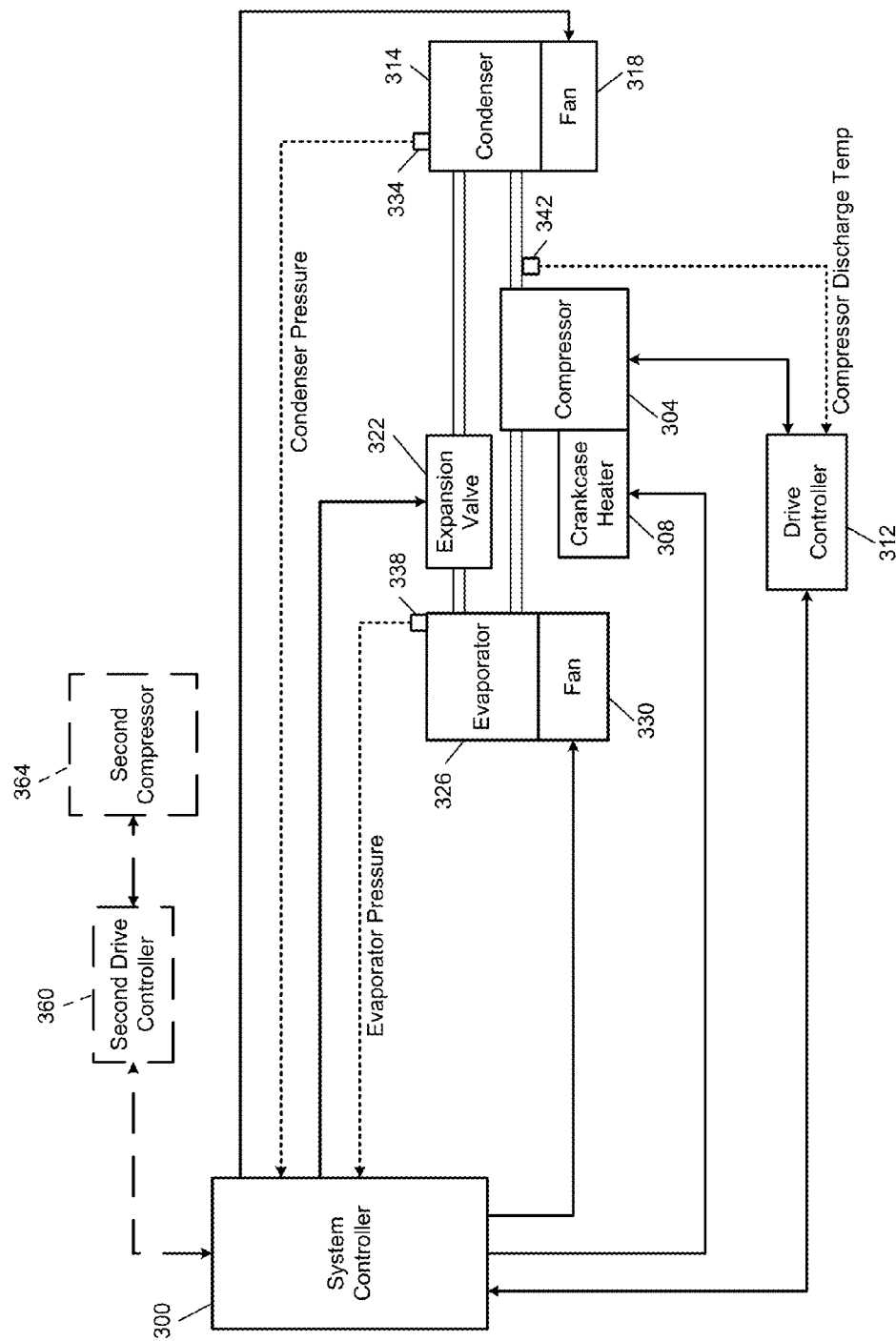
FIG. 3A is a block diagram of an example heating, ventilation, air conditioning, or refrigeration (HVAC/R) system according to the principles of the present disclosure.

FIG. 3A shows a heating, ventilation, air conditioning, or refrigeration (HVAC/R) system controlled by a system controller 300. The HVAC/R system may include a refrigeration loop with a compressor 304. In various implementations, a crankcase heater 308 is integrated with (or within) the compressor 304 to prevent refrigerant migration, prevent refrigerant condensation, and maintain lubrication properties of lubricant in the compressor 304. The crankcase heater 308 may be controlled by the system controller 300 or by a drive controller 312. Additionally, or alternatively, heating may be performed by passing current through a stator of the compressor 304.

The compressor 304 is operated by the drive controller 312 according to commands from the system controller 300. The system controller 300 may be referred to as an original equipment manufacturer (OEM) controller, while the drive controller 312 may be produced by a supplier to the OEM. The compressor 304 and the drive controller 312 may be purchased and integrated with the system controller 300 by the OEM.

As described above, the compressor 304 compresses refrigerant and delivers the compressed refrigerant to a condenser 314. A condenser fan 318 blows air across the condenser 314 to facilitate heat transfer between the refrigerant and ambient air. Refrigerant from the condenser 314 is delivered through an expansion valve 322 to an evaporator 326. An evaporator fan 330 blows air across the evaporator 326 to facilitate heat transfer between the refrigerant and surrounding air. The evaporator fan 330 may also serve to circulate conditioned air through the space being conditioned by the refrigeration loop.

The system controller 300 may control operation of the expansion valve, the evaporator fan 330 and the condenser fan 318. The evaporator fan 330 may also be called a circulator blower. In various implementations, temperatures and pressures of refrigerant and/or air may be measured. In the example shown, a condenser pressure sensor 334 measures the refrigerant pressure at the condenser 314 and an evaporator pressure sensor 338 measures refrigerant pressure at the evaporator 326. These pressures may be measured at an inlet, at an outlet, and/or at a middle position of the evaporator 326 and the condenser 314.

While shown being provided to the system controller 300, these pressures may instead be measured by the drive controller 312. The drive controller 312 may then provide pressure data to the system controller 300 using a bi-directional communications interface, which may include a digital or analog interface. In FIG. 3A, the system controller 300 receives the condenser and evaporator pressures and provides the pressure data to the drive controller 312.

The compressor 304 has a suction port that receives refrigerant and a discharge port that discharges higher pressure refrigerant. A temperature of refrigerant at the discharge port is measured by a compressor discharge temperature sensor 342 and provided to the drive controller 312. This compressor discharge temperature may then be provided to the system controller 300. Alternatively, the compressor discharge temperature may be measured by the system controller and provided to the drive controller 312.

The system controller 300 and the drive controller 312 may individually or together monitor the compressor discharge temperature to ensure that the compressor discharge temperature does not exceed a threshold, such as 275° Fahrenheit. If this threshold is exceeded, the compressor 304 may be powered down or other remedial action may be taken.

The system controller 300 may control additional components, such as an additional refrigerant loop. The system controller 300 may therefore interface with a second drive controller 360, which operates a second compressor 364. In various implementations, the second compressor 364 may operate in conjunction with the compressor 304 in the first refrigerant loop. For example, the compressor 304 and the second compressor 364 may be placed in parallel or in series (which may be referred to as a tandem configuration).

In various implementations, a user of the building in which the system controller 300 is installed may interact with the system controller 300, such as via a thermostat or a graphical user interface, to program the system controller with temperature setpoints, hours of operation, etc.

The drive controller 312 may also offer a user interface, which may allow, for example, an installation contractor to configure the drive controller 312 to work with the compressor 304 according to the parameters of the system controller 300. For example only, some or all of the thresholds described below may be specified by the installation contractor. Some or all of these thresholds may have default values that will be used if the installation contractor does not override them. In addition, some or all values may be programmed into the drive controller 312 by the system controller 300 or may be provided as needed from the system controller 300.

Figure 3B:
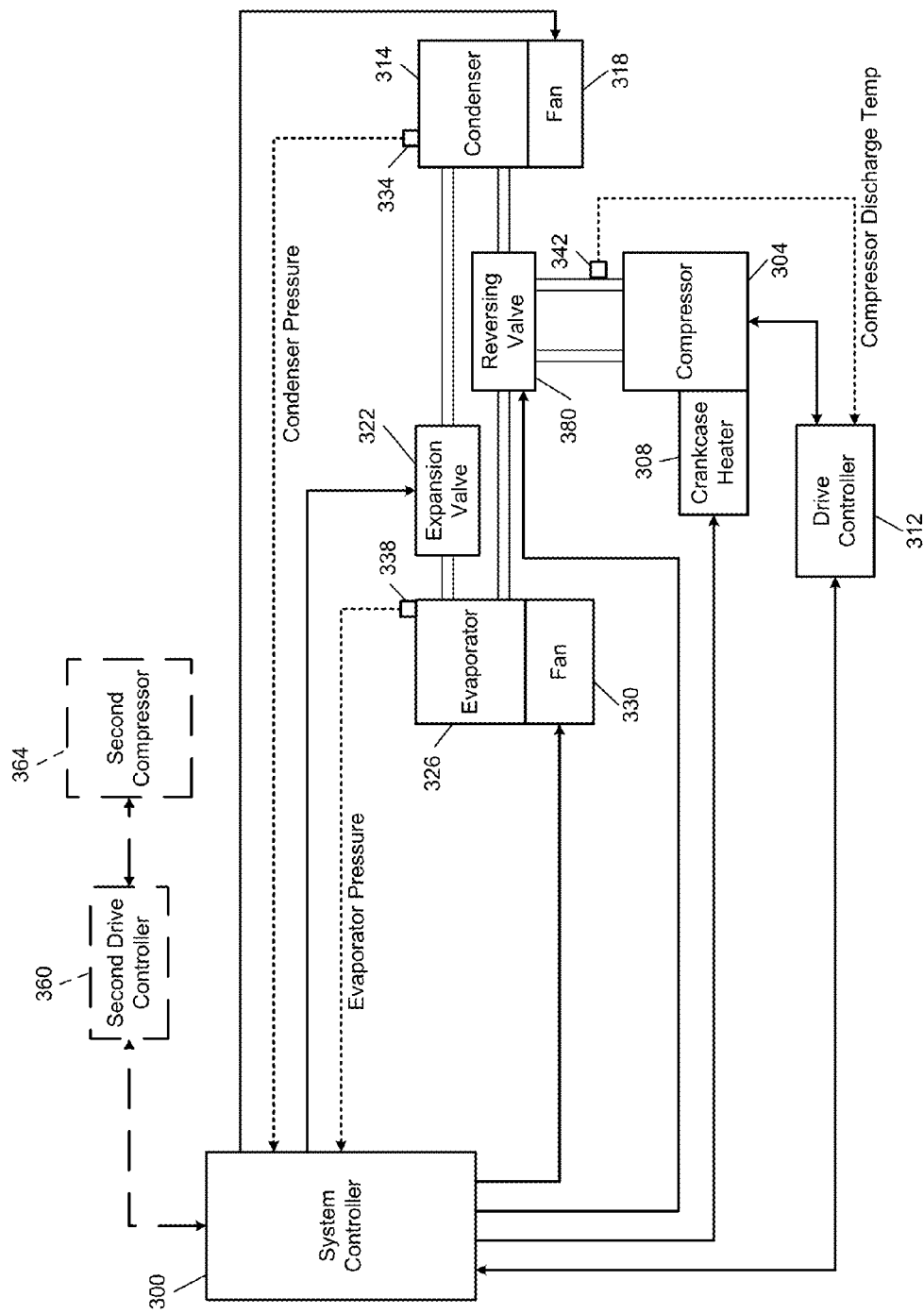
FIG. 3B is a block diagram of a heat pump implementation of FIG. 3A.

In FIG. 3B, a system similar to that of FIG. 3A is shown. In a heat pump configuration, the conditioned space may be heated as well as cooled. A reversing valve 380 (sometimes referred to as a 4-way valve) controls whether the discharge port of the compressor 304 is connected to the condenser 314 or to the evaporator 326. Similarly, the reversing valve 380 connects the suction port of the compressor 304 to the opposite of the condenser 314 and the evaporator 326.

Figure 1:
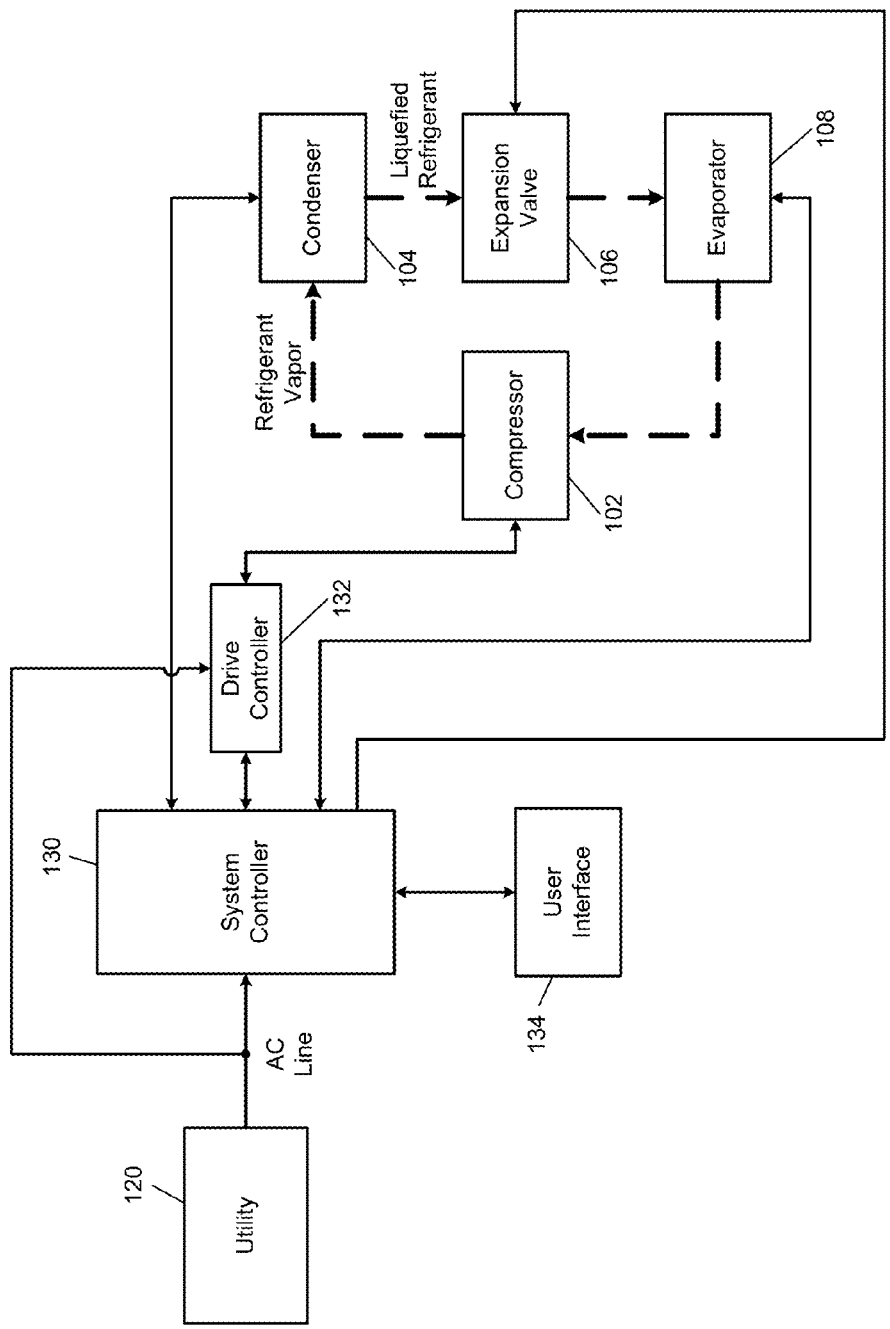
FIG. 1 is a block diagram of a refrigeration system according to the prior art.

When the reversing valve 380 reverses the direction of flow of refrigerant from what is described in FIG. 3A and FIG. 1, the roles of the condenser 314 and the evaporator 326 are switched. In other words, when the flow of the refrigerant is reversed, a heat exchanger labeled as the condenser 314 acts as an evaporator and a heat exchanger labeled as the evaporator 326 acts as a condenser. In various implementations, additional expansion valves, bypass valves, filter-dryers, etc., may be used in the heat pump system.

When the heat pump system is operating in heating mode, the condenser 314 is attempting to gather heat from the ambient air to warm the refrigerant. At low temperatures, condensation on the exterior of the condenser 314 may begin to freeze and may prevent adequate heat transfer with the refrigerant. The system controller 300 may, therefore, initiate a defrost cycle in which the system controller 300 actuates the reversing valve 380 to direct the flow of the refrigerant in the normal air conditioning direction. This will gather heat at the evaporator 326 and release the heat at the condenser 314 to melt the frozen condensate.

The system controller 300 also controls, via the drive controller 312, the startup, shutdown, and normal operation of the compressor 304. During normal operation the system controller 300 may dictate to the drive controller 312 at what speed the compressor 304 should run, such as by using an analog signal (such as a voltage level) or a digital command. The drive controller 312 then operates the compressor 304 to achieve the speed demand from the system controller 300.

The system controller 300 may control operation of the reversing valve 380 and may also control the operation of the condenser fan 318 and the evaporator fan 330. The condenser fan 318 and the evaporator fan 330 maybe single-speed fans or may, in various implementations, allow selection of a fixed number of different discreet speeds. The number of different speeds may be, for example, two or three.

Figure 4:
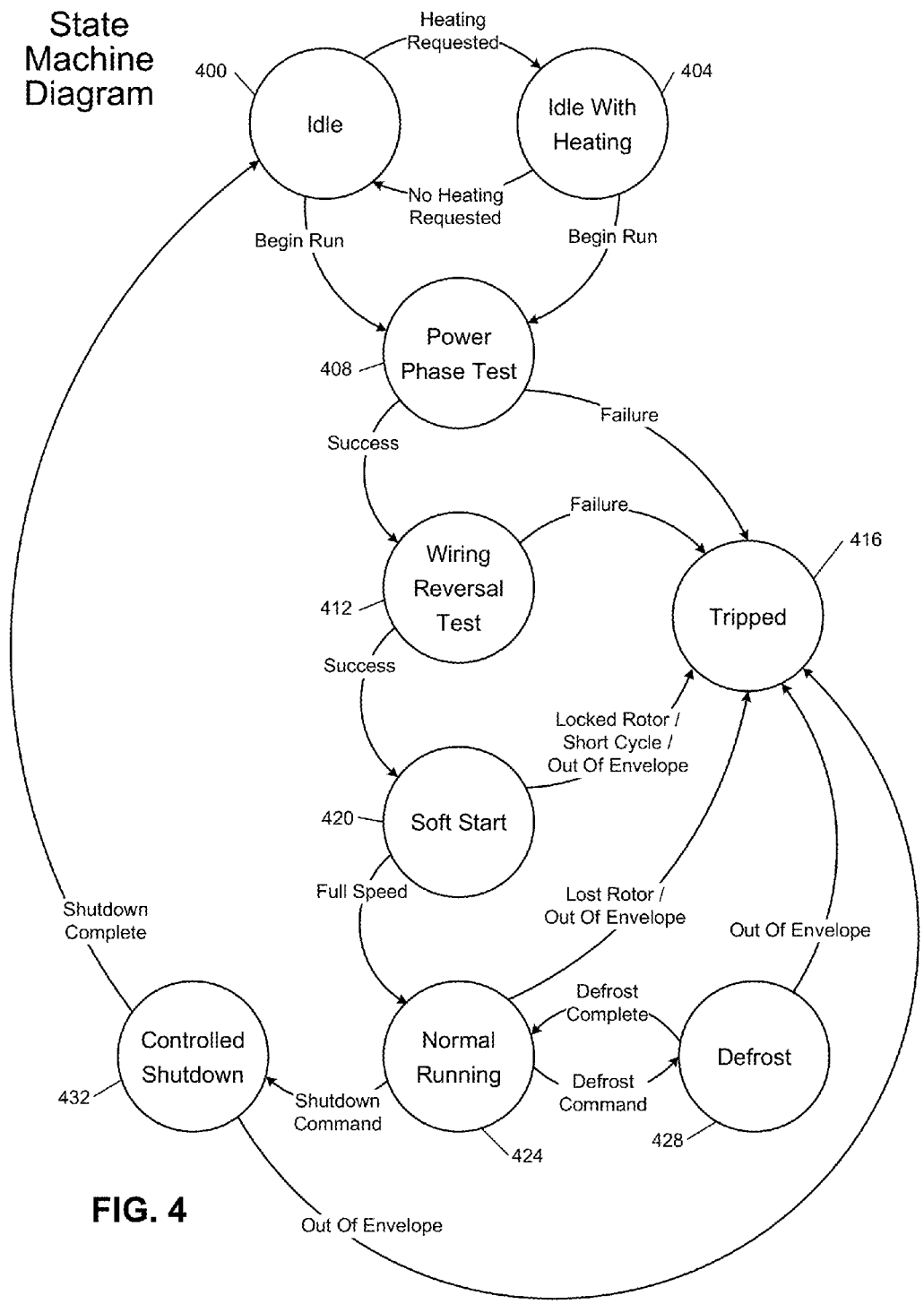
FIG. 4 is a state machine diagram of a simplified example set of operational states for a drive controller.

In FIG. 4, a state machine diagram shows a simplified set of example states in which the drive controller 312 operates and shows the trigger conditions for transitioning from one state to another. The drive controller 312 starts up into an idle state 400.

Depending on ambient temperature and time since last operation of the compressor, heating may be requested to keep the compressor warm. This may prevent, for example, lubricant in the compressor from becoming too cold, which may adversely affect lubrication properties, and prevent refrigeration migration. When heating is requested, the drive controller 312 transitions to state 404, which is an idle state with heating—generally bottom sump heating. For example, heating may be performed with a crankcase heater or by passing electrical current through the stator of the compressor.

In the idle state 400, the compressor motor is not energized and no power is provided to the compression motor. In state 404, the motor may be heated by passing current through the motor without rotating the motor. When heating is no long requested, the drive controller 312 transitions back to the idle state 400. In either state 400 or state 404, when a command is received from the system controller 300 to begin running the motor, the drive controller 312 transitions to state 408.

In state 408, the drive controller 312 tests the phases of the input power to, for example, determine whether one of the phases is missing or whether voltages of the phases are imbalanced. Upon successful conclusion of this test, the drive controller 312 transitions to state 412. Upon failure, the drive controller 312 transitions to state 416.

State 416 is a tripped state where energization of the motor is stopped. For example, while not shown in FIG. 4, the drive controller 312 may automatically transition back to state 400 or state 404 following the trip after a predetermined amount of time has elapsed.

Some trip conditions may prevent the motor from starting until manual intervention is performed, referred to as motor lockout. In such cases, the drive controller 312 remains in state 416 until the manual intervention, such as power being removed from the drive controller 312, is performed. Upon power being reapplied, the drive controller starts up in the idle state 400.

In state 412, the drive controller 312 performs a wiring reversal test. This determines whether the AC line has been connected correctly to the drive controller 312. For example, the drive controller 312 may detect that two of the phases of the AC power have been reversed when peak voltages on the phases of the AC line are not detected in the expected order. In other implementations, phase reversal may be detected by comparing a measured torque profile against expected torque profiles. Upon failure of the wiring reversal test, the drive controller 312 transitions to state 416. Meanwhile, upon a successful test the drive controller 312 transitions to state 420.

In state 420, the drive controller 312 begins a soft start of the motor. Once the motor has reached full speed, the drive controller 312 transitions to state 424. If, while performing the soft start, a locked rotor condition is detected or a short cycling issue is determined or the compressor is being operated outside of its operational envelope, the drive controller 312 transitions to the tripped state 416. Short cycling refers to the compressor 304 being turned on and off too many times in too short an interval.

In state 424, the drive controller 312 operates the motor in a normal running mode based on a speed provided by the system controller 300. In response to detecting the compressor operating outside its operating envelope, or if accurate estimation of the rotor is lost, the drive controller 312 transitions to the tripped state 416.

In response to a defrost command from the system controller 300, the drive controller 312 transitions to state 428. In state 428, the drive controller 312 performs a defrost operation based on predetermined values and/or values specified by the system controller 300. If the compressor 304 is determined to be operating outside of its operating envelope, the drive controller 312 transitions to the trip state 416. Meanwhile, if the defrost cycle is complete, the drive controller 312 transitions back to the normal running state 424. In various implementations, the drive controller 312 may transition from the defrost state 428 back to the normal running state 424 in response to a request to terminate defrost early from the system controller 300.

In response to a shutdown command from the system controller 300, the drive controller 312 transitions from state 424 to state 432, where the drive controller initiates a controlled shutdown of the motor. In response to determining that the compressor is operating outside of its operating envelope, the drive controller 312 transitions to the tripped state 416; otherwise, upon completion of shutdown, the drive controller 312 returns to the idle state 400.

Figure 2:
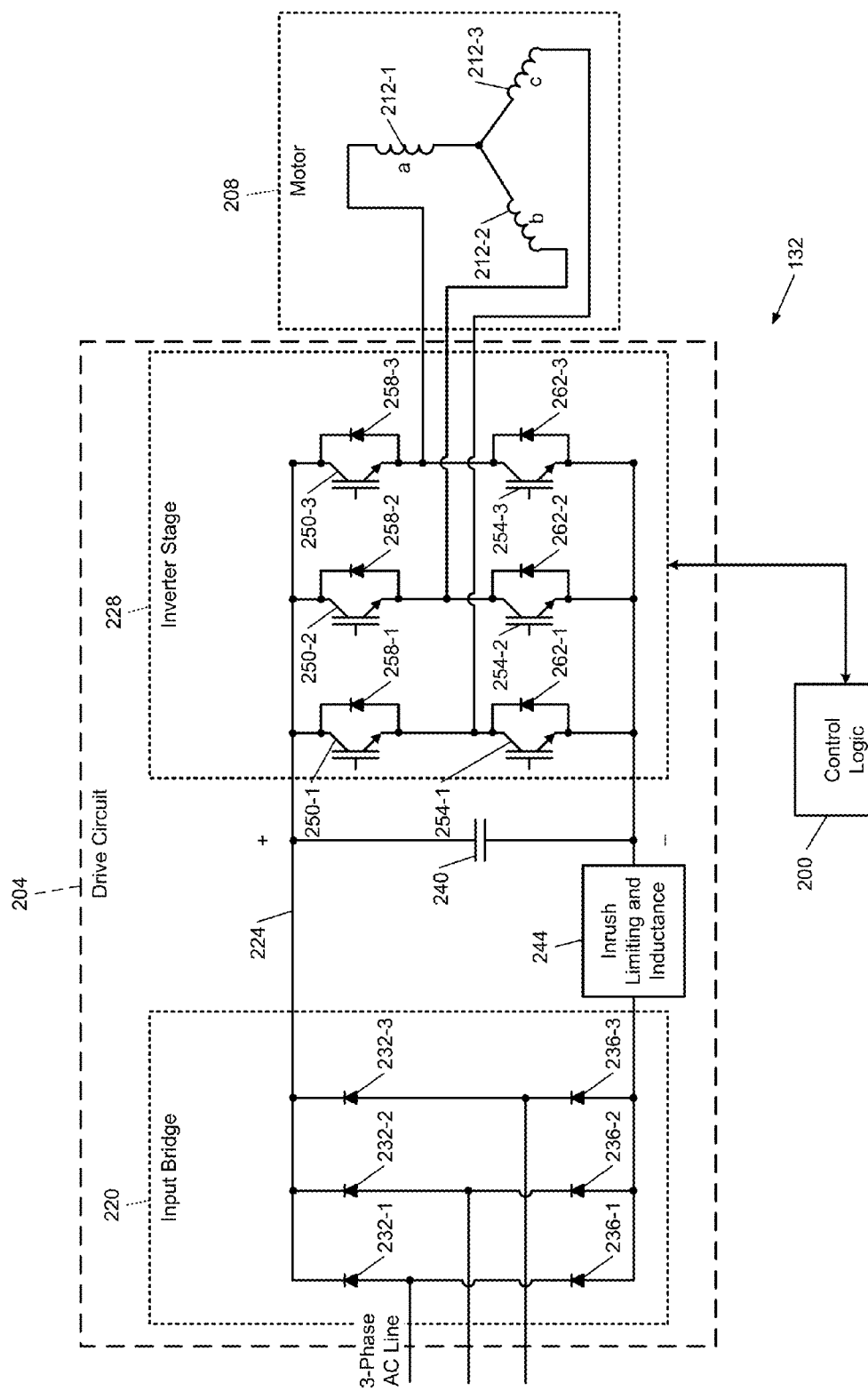
FIG. 2 is a simplified schematic of a drive controller according to the prior art.
Figure 5:
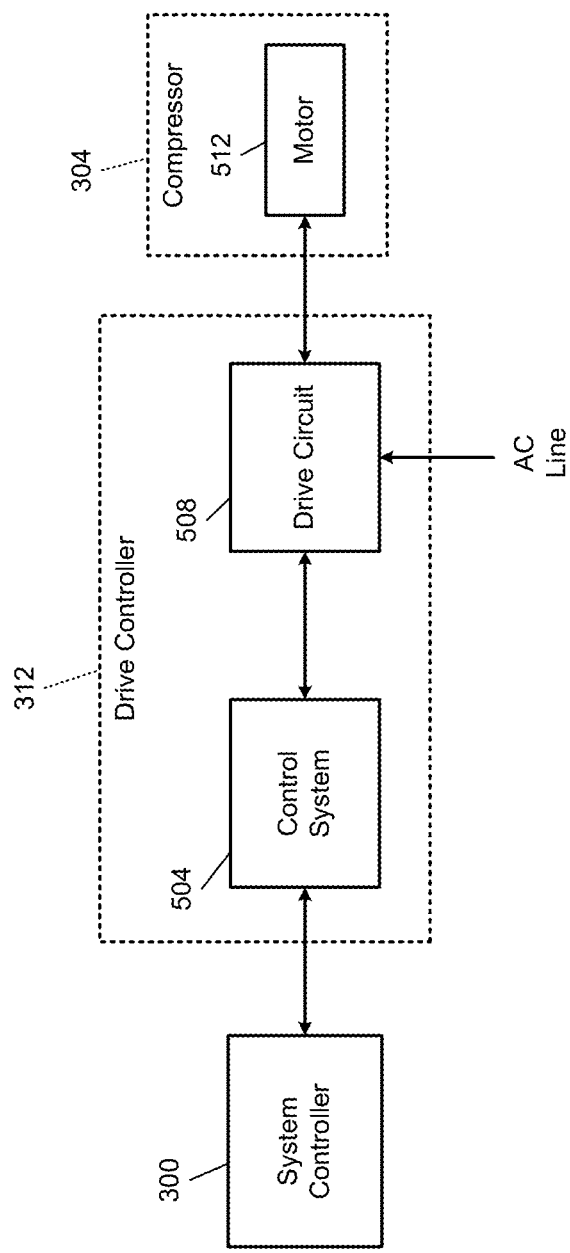
FIG. 5 is a high level functional block diagram of the drive controller

In FIG. 5, a high level functional block diagram of the drive controller 312 includes a control system 504 and a drive circuit 508. The control system 504 interfaces with the system controller 300 and controls switches within the drive circuit 508. For example only, the drive circuit 508 may be implemented similarly to the drive circuit 204 of FIG. 2. The drive circuit 508 includes switches actuated by the control system 504 that selectively apply a voltage based on an incoming AC line power source to a motor 512 of the compressor 304.

Figure 6:
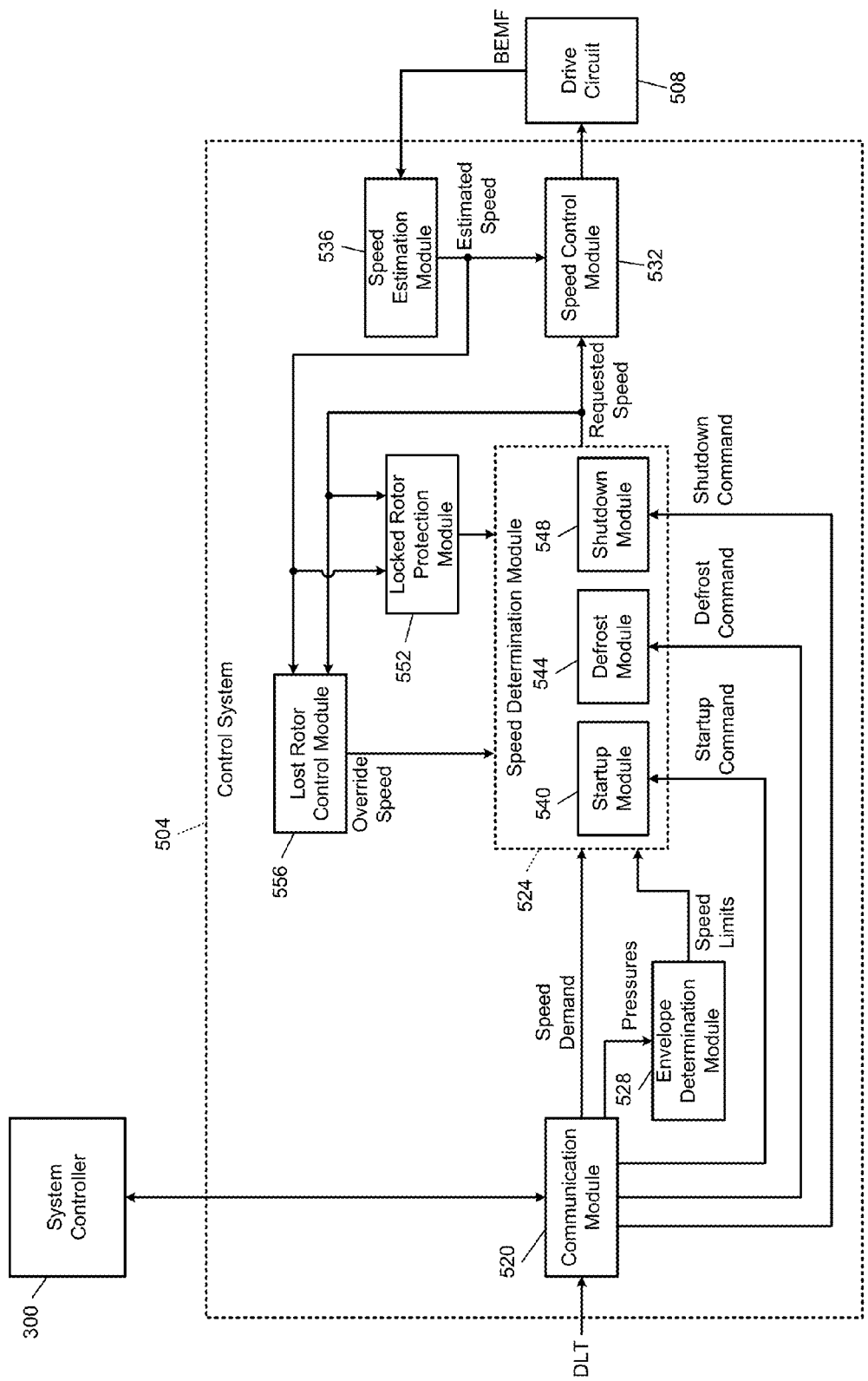
FIG. 6 is a functional block diagram of an example implementation of the control system.

In FIG. 6, a functional block diagram of an example implementation of the control system 504 is shown. The control system 504 includes a communication module 520 that communicates with the system controller 300. In the example of FIG. 6, the communication module receives the discharge line temperature and may provide the discharge line temperature to the system controller 300. If the discharge line temperature exceeds a threshold, the communication module may generate a fault signal that causes the control system 504 to power down the motor 512.

In normal operation, the communication module 520 sends a speed demand to a speed determination module 524. The speed demand is received from the system controller 300 and indicates the speed at which the system controller 300 would like the motor 512 to rotate. In various implementations, the communication module 520 may instruct the speed determination module 524 to power down the motor 512 by setting the speed demand to a zero value. This zero value may indicate a fault condition such as an excessively high discharge line temperature or the receipt of a shutdown request from the system controller 300. Similarly, the system controller 300 may simply send a speed demand of zero to the communication module 520 to indicate a desire to power down the motor 512.

The communication module 520 may receive measured data from the system controller 300, including pressures such as a condenser pressure and an evaporator pressure. These pressures are provided to an envelope determination module 528 that determines an acceptable speed limit range based on the pressures. An example envelope is described in more detail in FIG. 7. The speed determination module 524 may restrict a requested speed to be within the speed limits and/or may signal a fault if the requested speed falls outside of the speed limits designated by the envelope determination module 528.

The requested speed generated by the speed determination module 524 is provided to a speed control module 532. The speed control module 532 actuates the drive circuit 508 to produce rotation of the motor 512 at the requested speed. A speed estimation module 536 estimates a speed of the motor 512 and provides that estimated speed to the speed control module 532. The speed estimation module 536 may estimate speed based on back electromotive force (BEMF) measured at the drive circuit 508. In other implementations, a speed may be measured (such as by using a Hall effect sensor) and provided to the speed control module 532.

The speed control module 532 controls switching of the drive circuit 508 to minimize an error between the requested speed and the estimated speed. In normal operation, the speed determination module 524 will output the speed demand from the system controller 300 as the requested speed. However, in various modes, the speed determination module may use an alternate speed as the requested speed.

For example, a startup module 540 may provide for a soft start of the motor 512. Instead of immediately attempting to run the motor 512 at full speed, the startup module 540 may gradually ramp up the requested speed until a target speed is reached. This is discussed in more detail below in FIG. 8.

A defrost module 544 allows the system controller 300 to specify a defrost mode. The defrost module 544 may generate the requested speed during the defrost mode and the speed generated by the defrost module 544 may be set according to a tradeoff of noise versus time required to defrost. For example, a predetermined speed may be empirically determined to have a lowest noise generated by the compressor 304. However, a higher speed may allow the defrost process to complete sooner.

The system controller 300 may therefore instruct the defrost module 544 to perform either a high speed defrost or a low noise defrost. There may be speeds that strike different balances between these two factors and the system controller 300 may instead specify one of these alternative speeds. Alternatively, the system controller 300 may specify a desired time for defrost, from which the defrost module 544 can determine a corresponding speed. Operation of the defrost module 544 is described in more detail below in FIG. 11.

A shutdown module 548 allows for controlled shutdown of the compressor. This may reduce nuisance noise, compressor bearing wear, and reverse rotation of the compressor 304 due to high pressure refrigerant at the discharge port. The shutdown module 548 may therefore ramp down the requested speed prior to cutting the requested speed to zero. This is described in more detail below in FIG. 12.

A locked rotor protection module 552 determines whether the compressor 304 is being prevented from rotating. This is called a locked rotor condition and causes the locked rotor protection module 552 to instruct the speed determination module 524 to power down the motor 512.

The locked rotor protection module 552 may detect locked rotor conditions incident to startup of the motor 512. If an obstruction later hampers rotation of the compressor 304, this may be assessed by a lost rotor control module 556. The lost rotor control module 556 detects when the estimated speed falls too far below the requested speed.

In certain circumstances, decreasing the requested speed may allow the motor 512 to achieve the requested speed, thereby reacquiring closed loop control of the motor 512 (sometimes referred to as finding the rotor, catching the rotor, or spin starting). The lost rotor control module 556 may therefore provide an override speed to the speed determination module 524.

The override speed is output by the speed determination module 524 as the requested speed and may be reduced until the motor 512 can rotate at the requested speed. Then the lost rotor control module 556 may increase the override speed until the override speed is no longer needed and the speed determination module 524 can output the requested speed as normal without input from the lost rotor control module 556. Additional details are provided in FIG. 10.

Figure 7:
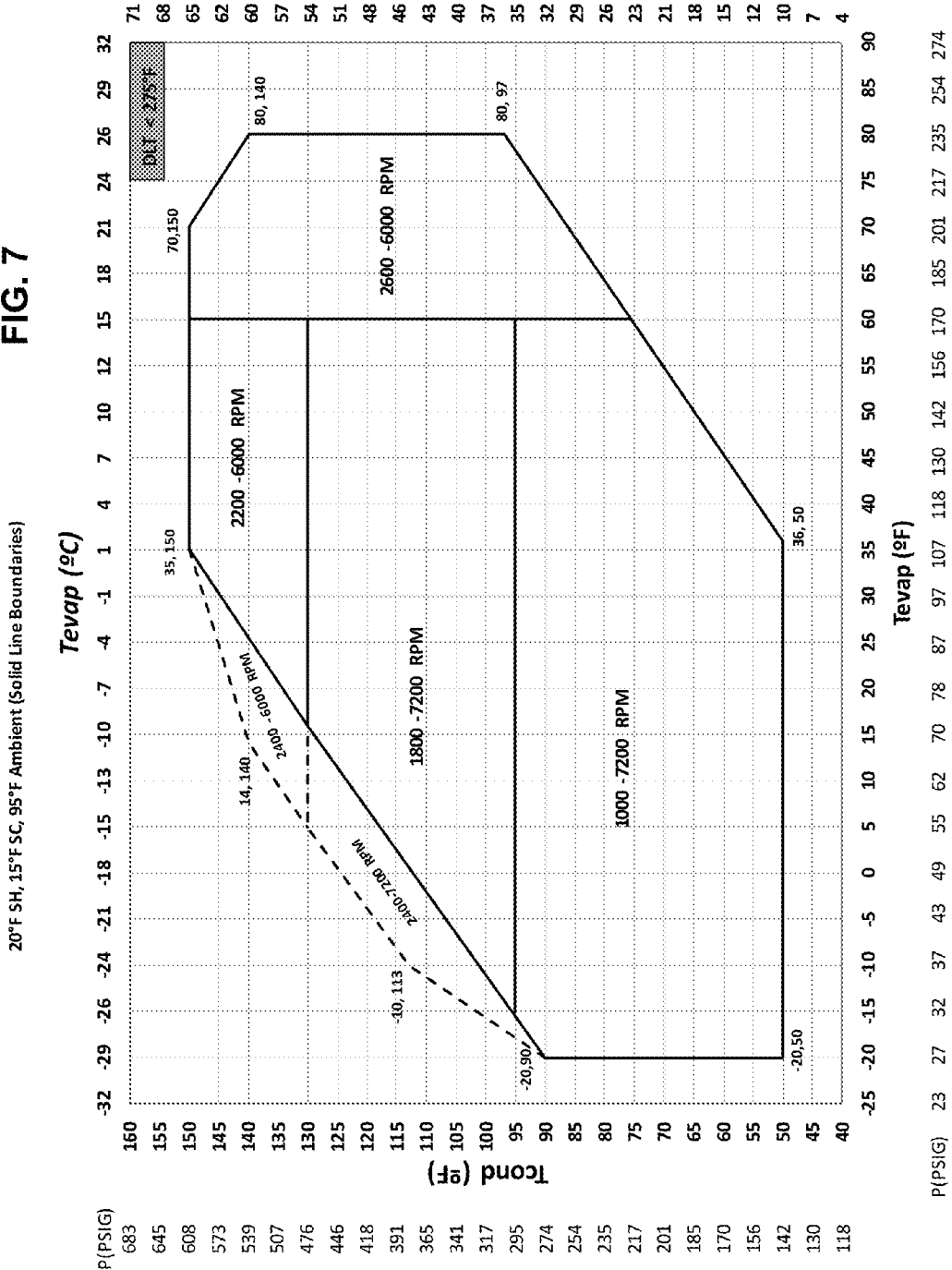
FIG. 7 is an example operating envelope for a compressor.

In FIG. 7, an example operating envelope for the compressor 304 is shown. The X-axis is evaporator pressure in pounds per square inch gage (psig), which corresponds directly to evaporator temperature. The Y-axis is the condenser pressure in psig, which corresponds directly to condenser temperature. Condenser temperature and evaporator temperature are displayed in both degrees Fahrenheit and degrees Celsius.

The envelope includes various regions defined by evaporator and condenser pressures and each region has a corresponding speed range within which the compressor can reliably operate. Depending on the drive controller 312, some or all of these ranges may need to be further restricted. For example, lower-power drive controllers may not allow the highest speed operation at higher pressures.

Further, drive controllers may need to be de-rated as ambient temperature increases above a nominal value (such as 95° F.) or as the supplied AC voltage sags below a nominal value. In other words, as ambient temperature goes up, the available speed range may contract in some or all portions of each region. Similarly as supply voltage decreases, the speed ranges may contract on one or both ends.

The two regions outlined by dashed lines may be achievable by the compressor but testing may be required by the original equipment manufacturer to determine appropriate constraints to apply to compressor operation in those regions. For example, the constraints may include certain super-heat and sub-cooling values.

Figure 8:
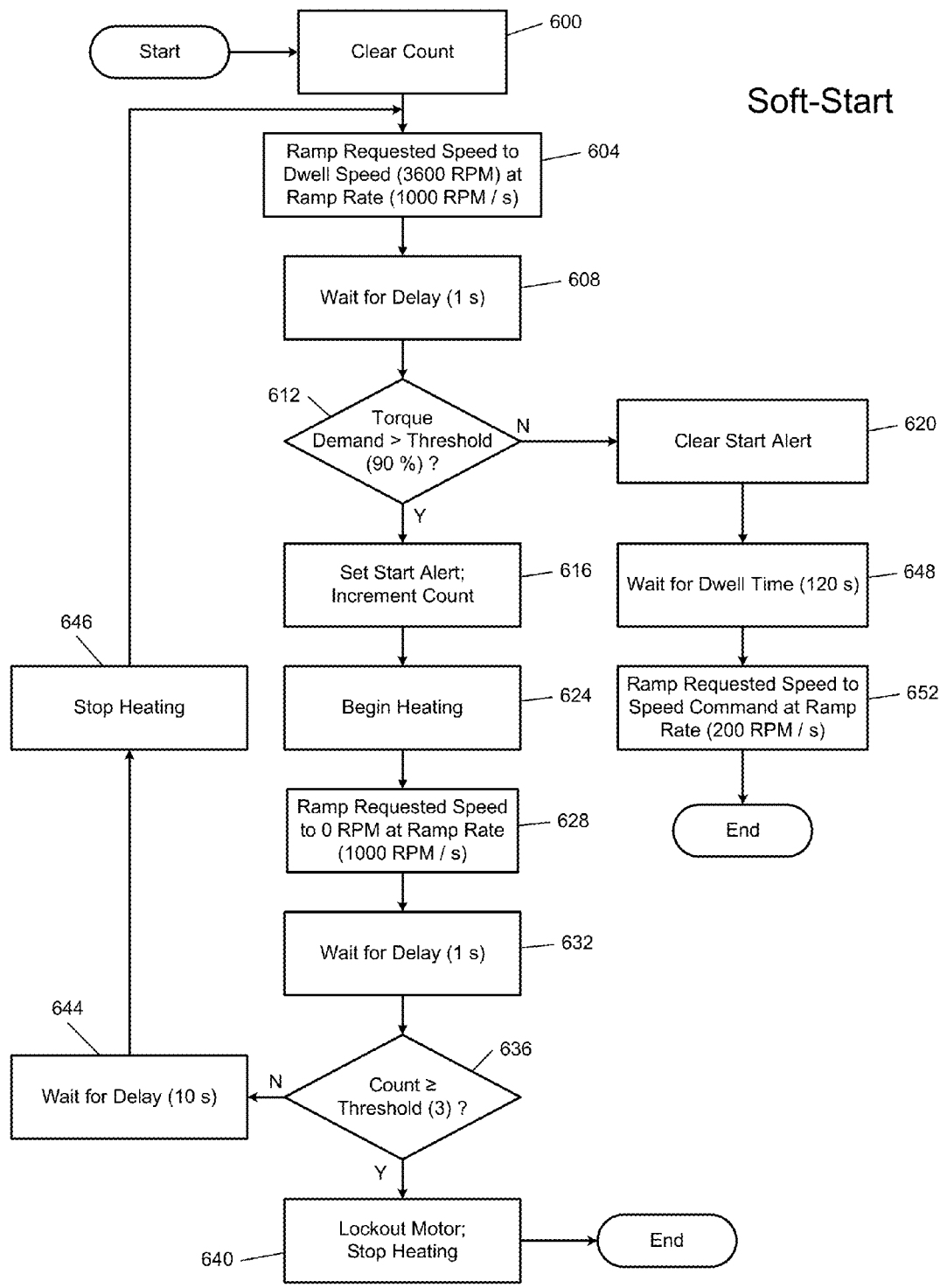
FIG. 8 is a flowchart depicting example operation of soft starting a compressor motor.

In FIG. 8, example operation of soft starting is presented. Control begins at 600, where a count is cleared. Control continues at 604 where the requested speed is ramped to a dwell speed at a predetermined ramp rate. For example only, the dwell speed may be 3,600 rpm and the ramp rate may be 1,000 rpm/second. Both of these values may be programmed at installation and may be modified, such as by the system controller 300.

At 608, control waits for a predetermined delay, such as 1 second. Control continues at 612 and determines whether a torque demand is greater than a threshold. If so, control transfers to 616; otherwise control transfers to 620. For example only, the threshold may be expressed as a percentage of maximum torque, such as 90% of the maximum. If the torque demand is greater than this threshold, an unexpected condition has developed and a start alert is set at 616. In addition, the count, which tracks the number of consecutive start alerts, is incremented.

In various implementations, at 624, control begins heating the bottom sump of the compressor. As described above, this may be performed with stator heating or a crankcase heater, as examples. If liquid refrigerant is present in the compressor, the torque may be greatly increased. The heating may be sufficient to boil the refrigerant off and permit the compressor to start with a normal torque level.

At 628, control ramps the requested speed down to zero at a predetermined ramp rate. For example, the ramp rate may be 1,000 rpm/second. This ramp rate may be the same as or may be configured separately from the ramp rate of 604. At 632, control waits for a delay before proceeding to 636. As an example, the delay is 1 second, which may be the same as or set independently of the delay in 608.

At 636, control determines whether the count has reached a threshold. If so, control transfers to 640, where the motor is locked out. In other words, manual intervention is required before the motor will restart. In addition, any compressor heating is halted. Control then ends. The threshold of 636 in one example is 3. If the threshold has not been reached at 636, control transfers to 644. At 644, a restart delay is timed. For example only, the restart delay may be 10 seconds. Control continues at 646, where compressor heating is stopped. Control then returns to 604.

Returning to 620, the start alert is cleared and control continues at 648. At 648, control waits for a dwell time. This dwell time may be, for example, 120 seconds. Control then continues at 652, where control ramps the requested speed toward the speed demand at a predetermined ramp rate. For example only, the ramp rate may be 200 rpm/second. Control then ends.

In the above, various parameters may be set within a predefined range with a predefined resolution. For example only, the dwell speed of 604 may be set between 1,500 rpm and 7,200 rpm in units of 0.1 rpm. The ramp rate of 604 may be set from 0.5 seconds per each 1,000 rpm (equivalent to 2000 rpm/second) up to 2.5 seconds/1,000 rpm. The dwell time of 648 may be set between 120 seconds and 300 seconds. The threshold of 636 may be set from zero to three.

In various implementations, the ramp rate of 604 may assume different values over the duration of the ramp. For example only, the ramp rate from zero rpm up to 300 rpm may be fixed at a certain value such as 1,000 rpm/second. The ramp from 300 rpm up to the dwell speed may then be performed at the configured ramp rate, which is shown as 1,000/second in FIG. 8.

Once soft start has been completed, the motor is operating in a normal running state (state 424 or FIG. 4). When a new speed demand is received from the system controller 300, the control system 504 may ramp up or down the requested speed to reach the new speed demand at a predetermined rate. The predetermined rate may be set separately for acceleration compared to deceleration. For example only, the acceleration rate may be set between 5 seconds/1,000 rpm to 1,000 seconds/1,000 rpm. Similarly, the deceleration rate may be set, in one example, from 5 seconds/1,000 rpm to 1,000 seconds/1,000 rpm.

The manual intervention required due to the motor lockout of 640 may be provided by a power cycle of the drive controller 312, performed by turning off and turning on the drive controller 312. The manual intervention may also include a reset command sent over a communication bus such as MODBUS communications bus, a reset signal provided to a specific input on the drive controller, or a reset initiated by a user interface such as a keypad on the drive controller.

Figure 9:
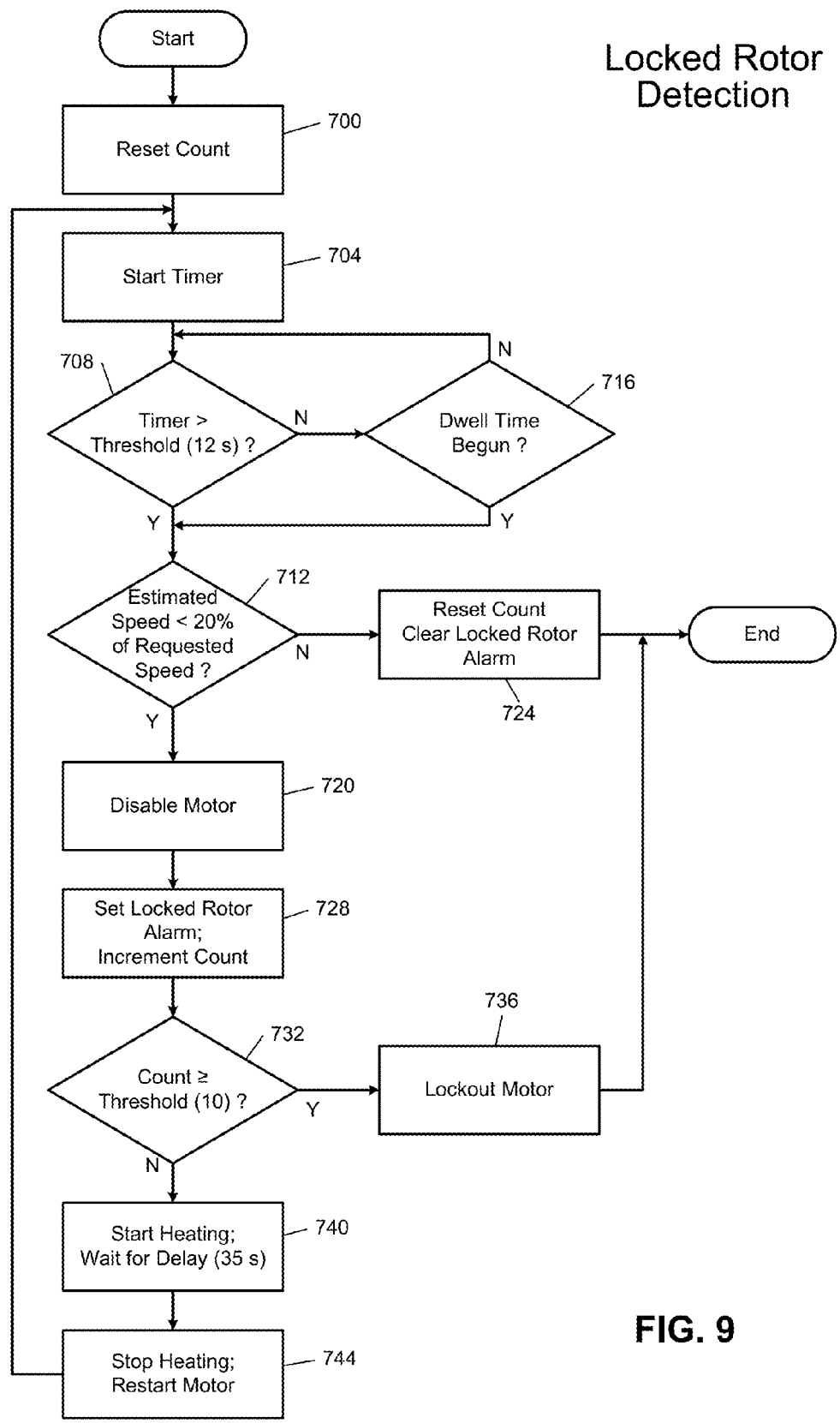
FIG. 9 is a flowchart depicting example operation of locked rotor detection.

In FIG. 9, example operation of locked rotor detection is described. Control begins when the motor is started at 700, where a count is reset. At 704, a timer is started to measure the amount of time since the beginning of the motor startup sequence. At 708, the timer is compared to a threshold value. If the timer exceeds the threshold, control transfers to 712; otherwise, control transfers to 716. For example only, the threshold may be 12 seconds.

At 716, if the dwell time of a soft start procedure (for example, 648 of FIG. 8) has begun, control transfers to 712; otherwise control returns to 708. At 712, control determines whether the estimated motor speed is less than 20% of the requested speed. If so, control transfers to 720; otherwise control transfers to 724. If the estimated speed is so far less than the requested speed, it is possible the rotor is locked and cannot rotate.

This determination of locked rotor is delayed until either a threshold period of time has elapsed (708) or the dwell time of the soft start has begun (716) to allow for startup irregularities to be resolved without causing false trips. For example, in a flooded start situation, in which the compressor contains liquid that must be processed (discharged), the initial amount of torque may be higher than normal and therefore the initial speed may be lower than normal. In addition, at the beginning of startup there may be slugs of liquid encountered by the motor, which may arrive from portions of the refrigerant lines.

However, once 712 is reached, the estimated speed should be closer to the requested speed and, therefore, if the estimated speed falls short of the requested speed a locked rotor condition is flagged. While 20% of the requested speed is shown as the threshold, other thresholds may be used, which may trade off the likelihood of false positives against the likelihood of false negatives. A false positive is where the rotor is not locked but is simply operating more slowly due to some startup irregularity, such as a significant amount of liquid in the compressor. In other words, a slow-starting but operable motor startup profile may be detected as a locked rotor. False negatives are situations where the motor cannot rotate freely but yet is not detected as a locked rotor or is not detected promptly.

At 720, the locked rotor condition has been detected and therefore the motor is disabled. Meanwhile, at 724, the motor has started without a locked rotor condition being detected and therefore the count is reset and the locked rotor alarm is cleared. Control then ends.

At 728, a locked rotor alarm is set to indicate the reason for the motor being disabled and the count is incremented. At 732, control determines whether the count has reached a threshold. If so, the motor is locked out at 736 so that further automatic restarts are not performed. After locking out the motor, control ends.

Meanwhile, if the count has not yet reached the threshold at 732, control transfers to 740. The threshold may be adjustable, such as from 1-10, and in the example of FIG. 9 is set to 10. At 740, control may begin heating the bottom sump of the compressor. As described above, this may be performed with stator heating or a crankcase heater, as examples. Liquid refrigerant present in the compressor may present as a locked rotor condition. The heating may therefore cause the refrigerant to boil off and permit the compressor to start.

Control waits for a delay period before proceeding to 744. The delay period may, in some implementations, be set between 30 and 300 seconds and in the example of FIG. 9 is set to 35 seconds. At 744, control stops the heating and begins a restart of the compressor motor. Control then returns to 704.

Figure 10:
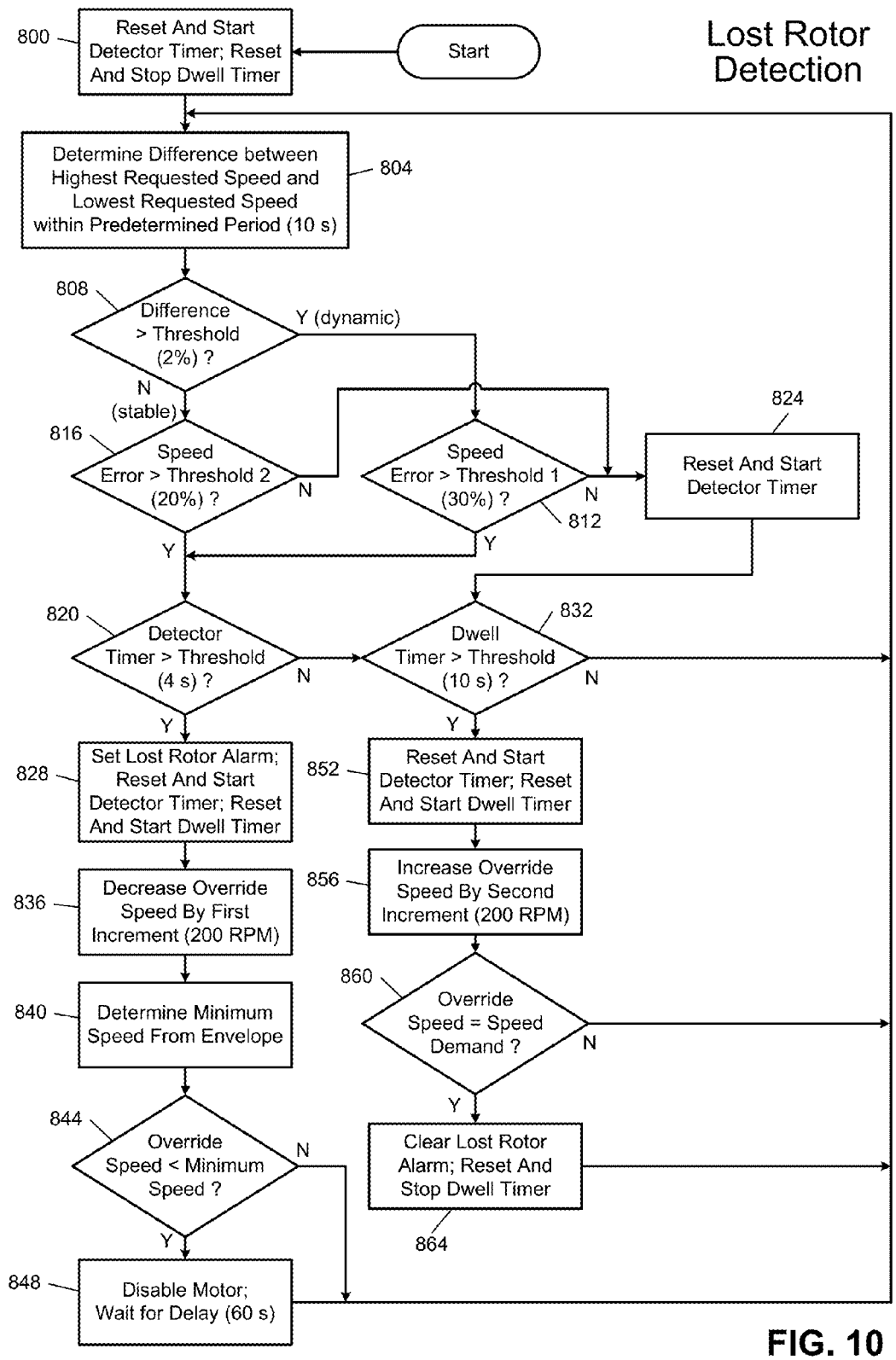
FIG. 10 is a flowchart depicting example operation of lost rotor detection.

In FIG. 10, example operation of lost rotor detection is described. As show in FIG. 4, lost rotor detection may be performed during normal running (state 424) but may be suspended during transitional operations such as soft start (state 420) and controlled shutdown (state 432). The lost rotor detection system detects conditions where the speed error, during active speed control, is greater than expected. For example, this may be due to a locked or stalling rotor while running.

To avoid nuisance trips during normal operation, multiple limits may be used. For example, two limits may account for greater expected speed error during dynamic periods where the requested speed is changing compared to static periods where the requested speed is not changing. These limits may allow for the completion of a flooded start (subsequent to the end of the soft-start process) and may permit small slugs of liquid to be processed by the compressor even during normal operation. Liquid slugs may be produced by, for example only, isolated refrigerant condensing in the system pipework or improper adjustment or malfunction of an expansion valve.

Control begins at 800, such as upon the conclusion of soft starting. Control resets a detector timer and starts the detector timer running. Control also resets a dwell timer and stops the dwell timer from running. Control continues at 804 and determines a measure of stability of the requested speed. For example, the stability may be measured by determining the difference between the highest requested speed and the lowest requested speed within a proceeding period of time. In one example only, this period is 10 seconds.

This period may be adjusted depending on how long it takes the drive in the compressor to recover from changes in the requested speed. If the drive controller and motor return to a steady state within, for example, 2 seconds of changes in requested speed, the preceding period of 804 may be changed to a value closer to 2 seconds.

At 808, control compares the difference to a threshold value. If the difference is greater than the threshold, the dynamic threshold is used and control transfers to 812; otherwise the stable threshold is used and control transfers to 816. The threshold may be expressed as a percentage—that is, what percentage the difference is of either the highest requested speed or the lower requested speed. In one example, the threshold is 2%.

At 812, control compares a speed error to a first threshold. If the speed error is greater than the first threshold, control transfers to 820; otherwise control transfers to 824. The speed error is the difference between the requested speed and the estimated speed. The threshold may be expressed as a percentage calculated by dividing the difference between the estimated speed and requested speed by the requested speed. In one example, the threshold is 30%.

At 816, control compares the speed error to a second threshold. The second threshold will generally be less than the first threshold because 816 is evaluated during a stable operating condition. If the speed error at 816 is greater than the second threshold, control transfers to 820; otherwise control transfers to 824. The second threshold in one example is 20%.

At 820, control determines whether the detector timer has exceeded a threshold. If it has, control transfers to 828; otherwise control transfers to 832. For example, the threshold period of time may be 4 seconds. At 824, an unexpected speed error was not present, and therefore the detector timer is reset (and begins running once again). Control then continues at 832. In other words, because the detector timer is reset at 824, the detector timer will exceed the threshold at 820 only when an excessive speed error has been present for the threshold period of time.

At 828, a lost rotor alarm is set to indicate a greater-than-expected speed error is present, and the detector timer and the dwell timer are both reset and started running. Control continues at 836 where the override speed is decreased by a first increment to attempt to resynchronize control with the movement of the rotor. For example only, the first increment may be 200 rpm.

In various implementations, the threshold period of 820 may be reduced once the lost rotor alarm has been set at 828. In this way, the override speed is decreased more often as the lost rotor state persists. For example, the threshold may be reduced from 4 seconds to 1 second so that the override speed is decreased once per second once the lost rotor alarm has been set and the rotor has not been recovered.

Control continues at 840, where a minimum speed is determined from the compressor operating envelope. At 844, control determines whether the new override speed is less than the determined minimum speed. If so, control transfers to 848; otherwise control returns to 804. At 848, the motor is disabled to avoid operating outside of the envelope. The motor may be automatically restarted after a delay period, such as 60 seconds. Control therefore returns to 804 after the delay period.

At 832, control determines whether the dwell timer is greater than a threshold. If so, control transfers to 852; otherwise control returns to 804. The dwell timer is used to gradually recover the motor back to the originally requested speed. After the rotor has been lost and the override speed has been decreased, the override speed is then slowly increased back to the requested speed. One incremental increase is performed after each dwell timer threshold period in which a lost rotor condition has not been detected. For example only, the threshold may be 10 seconds.

At 852, control resets the detector timer and starts the detector timer running and also resets and starts the dwell timer. At 856, control increases the override speed by a second increment. In various implementations, the second increment may be the same as or independent of the first increment of 836. In one example, the second increment is also 200 rpm.

Control continues at 860, where if the override speed is once again equal to the speed demand, the rotor has been successfully recovered and control transfers to 864. Otherwise, controls returns 804. At 864, the lost rotor alarm is cleared and the dwell timer is reset and stopped. Control then returns to 804.

Figure 11:
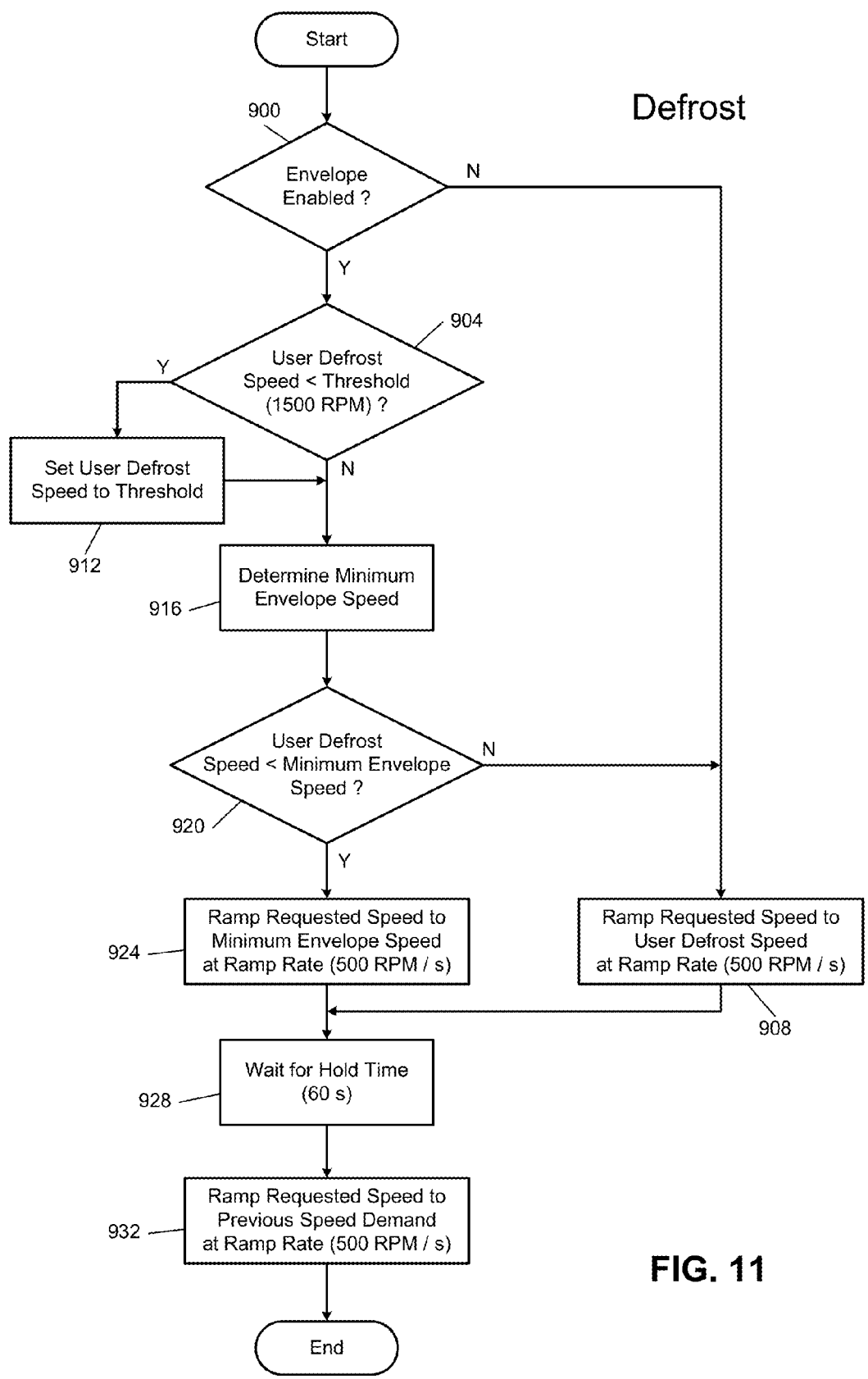
FIG. 11 is a flowchart depicting example operation of a defrost mode.

In FIG. 11, example operation of a defrost mode is shown. Control begins at 900, such as when a defrost command is received from the system controller 300. At 900, control determines whether envelope detection is enabled. If so, control transfers to 904; otherwise control transfers to 908.

At 904, control determines whether a programmed user defrost speed is less than a threshold. If so, control transfers to 912; otherwise control transfers to 916. At 912, the user defrost speed is increased to be equal to the threshold and control continues at 916. For example only, the threshold may be 1,500 rpm. In various implementations, the threshold may be set within a range from 1,500 rpm to 7,200 rpm with a resolution of 0.1 rpm. The user defrost speed may be programmed to correspond to a speed at which a noise level produced by the compressor 304 is at a minimum.

At 916, control determines a minimum speed according to an operating envelope, which may be determined based on condenser and evaporator pressures. At 920, control determines whether the user defrost speed is less than the minimum envelope speed. If so, control transfers to 924; otherwise control transfers to 908. At 924, control ramps the requested speed to the determined minimum envelope speed at a predetermined ramp rate. For example only, the ramp rate may be 500 rpm/second. This may also be expressed as 2 seconds/1,000 rpm and may be set within a range from 0.5 seconds/1,000 rpm to 20 seconds/1,000 rpm. Control then continues at 928.

At 908, control ramps the requested speed to the user defrost speed at a predetermined ramp rate. For example only, the ramp rate may be the same as the ramp rate of 924. Control then continues at 928. At 928, control waits for a hold time for the defrost to complete. For example only, the hold time may be 60 seconds and may be set within a range from 30 seconds to 300 seconds.

Control then continues at 932, where control ramps the requested speed back to the speed demand from prior to the defrost cycle at a specified ramp rate. In various implementations, this ramp rate may be different than the rate of 924 or of 908. This ramp rate may, in one example, be set between a rate of 0.5 seconds/1,000 rpm and 20 seconds/1,000 rpm. Control then ends.

Figure 12:
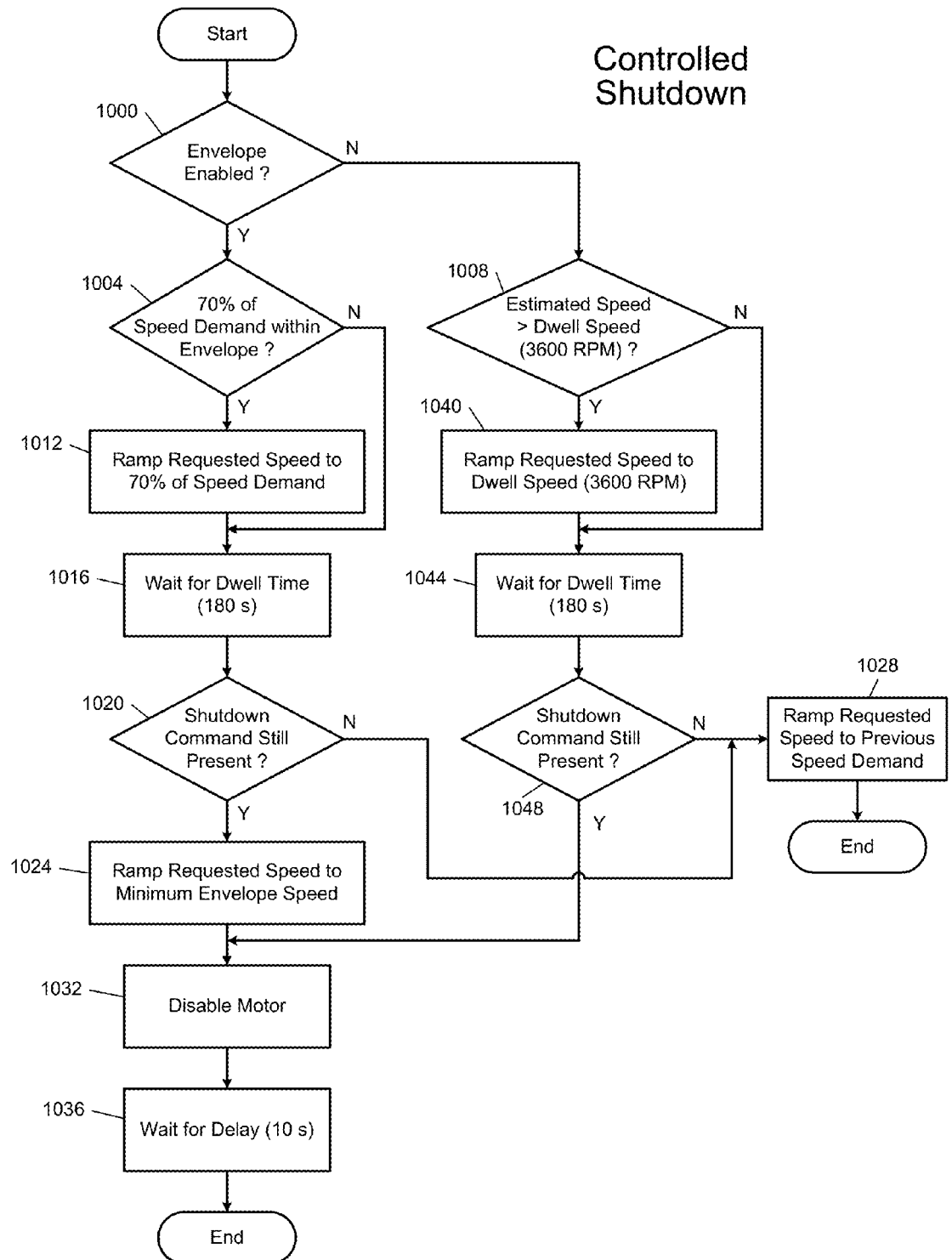
FIG. 12 is a flowchart depicting example operation of controlled shutdown.

In FIG. 12, an example controlled shutdown procedure is shown. Control begins at 1000 in response to a shutdown command from the system controller 300. If envelope protection is enabled, control transfers to 1004; otherwise control transfers to 1008. At 1004, control determines whether 70% of the speed demand (that is, the speed demand multiplied by 0.7) will be within the operating envelope. If so, control transfers to 1012; otherwise control transfers to 1016.

At 1012, control ramps the requested speed down to 70% of the speed demand. For example only, the ramp rate may be 200 rpm/second. Control then continues at 1016. At 1016, control waits for a dwell time of, for example, 120 seconds or 180 seconds. In various implementations, the dwell time may be set between 30 seconds and 300 seconds.

After waiting for the dwell time, control continues at 1020 where, if the shutdown command is still present, control continues at 1024; otherwise control transfers to 1028. At 1028, control ramps requested speed back to the speed demand and then control ends. At 1024, control ramps the requested speed down to the minimum envelope speed. Control then disables the motor at 1032 and waits for a delay period at 1036. For example only, the delay period may be 10 seconds. After the delay period, control ends, which returns the drive controller to an idle state (400 of FIG. 4).

At 1008, control determines whether the estimated speed is greater than a threshold. If so, control transfers to 1040; otherwise control transfers to 1044. For example, the threshold may be 3,600 rpm. At 1040, control ramps the requested speed to the dwell speed. For example only, the ramp rate may be 200 rpm/second. Control then continues at 1044. At 1044, control waits for a dwell time, which may be the same as the dwell time of 1016. After expiration of the dwell time, control continues at 1048. At 1048, if the shutdown command is still present, control transfers to 1032; otherwise controls transfers to 1028.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term 'module' or the term 'controller' may be replaced with the term 'circuit.' The term 'module' may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. §112(f) unless an element is expressly recited using the phrase "means for," or in the case of a method claim using the phrases "operation for" or "step for."

What is claimed is:

1. A drive controller for a motor of a compressor, the drive controller comprising:
   a drive circuit that applies voltages to windings of the motor;
   a speed control module that controls the drive circuit to rotate the motor at a requested speed;
   a speed determination module that generates the requested speed based on a speed demand from a system controller; and
   a lost rotor control module that identifies a lost rotor condition and, in response to identifying the lost rotor condition, instructs the speed determination module to set the requested speed to an override speed that is lower than the speed demand, wherein:
   the lost rotor control module identifies the lost rotor condition in response to a comparison of a speed error with an adaptive threshold,
   the speed error is based on a difference between the requested speed and an estimated speed of the motor,
   during a first system state, the adaptive threshold is equal to a first threshold, and
   during a second system state, the adaptive threshold is equal to a second threshold.

2. The drive controller of claim 1 wherein:
   the first system state corresponds to a dynamic period of the requested speed,
   the second system state corresponds to a stable period of the requested speed,
   the first system state and the second system state are mutually exclusive, and
   the first threshold is greater than the second threshold.

3. The drive controller of claim 2 wherein the lost rotor control module identifies the first system state in response to a variation in the requested speed being less than a predetermined amount over a preceding predetermined time period.

4. The drive controller of claim 3 wherein the predetermined amount is based on a percentage of the requested speed, the first threshold is thirty percent, and the second threshold is twenty percent.

5. The drive controller of claim 1 wherein:
   the lost rotor control module resets a detector timer in response to the speed error being below the adaptive threshold, and
   the lost rotor control module identifies the lost rotor condition in response to the detector timer exceeding a predetermined threshold period.

6. The drive controller of claim 1 wherein the lost rotor control module decreases the override speed by a predetermined increment in response to each additional identification of the lost rotor condition.

7. The drive controller of claim 6 wherein the lost rotor control module disables the motor in response to the override speed decreasing below a minimum operating speed.

8. The drive controller of claim 7 further comprising an envelope determination module that determines the minimum operating speed based on (i) a refrigerant pressure at a condenser in fluid communication with the compressor and (ii) a refrigerant pressure at an evaporator in fluid communication with the compressor.

9. The drive controller of claim 1 wherein, while the speed determination module is setting the requested speed to the override speed, the lost rotor control module increases the override speed by a predetermined increment for each predetermined dwell time period during which the lost rotor condition is not identified.

10. The drive controller of claim 9 wherein, in response to the override speed reaching the speed demand, the lost rotor control module instructs the speed determination module to resume generating the requested speed based on the speed demand.

11. A method of operating a drive controller for a motor of a compressor, the method comprising:
    applying voltages to windings of the motor;
    controlling the voltages to rotate the motor at a requested speed;
    generating the requested speed based on a speed demand from a system controller;
    selectively identifying a lost rotor condition in response to a comparison of a speed error with an adaptive threshold, wherein
    the speed error is based on a difference between the requested speed and an estimated speed of the motor,
    during a first system state, the adaptive threshold is equal to a first threshold, and
    during a second system state, the adaptive threshold is equal to a second threshold; and
    in response to identifying the lost rotor condition, setting the requested speed to an override speed that is lower than the speed demand.

12. The method of claim 11 wherein:
    the first system state corresponds to a dynamic period of the requested speed,
    the second system state corresponds to a stable period of the requested speed,
    the first system state and the second system state are mutually exclusive, and
    the first threshold is greater than the second threshold.

13. The method of claim 12 further comprising identifying the first system state in response to a variation in the requested speed being less than a predetermined amount over a preceding predetermined time period.

14. The method of claim 13 wherein the predetermined amount is based on a percentage of the requested speed, the first threshold is thirty percent, and the second threshold is twenty percent.

15. The method of claim 11 further comprising:
    resetting a detector timer in response to the speed error being below the adaptive threshold, wherein the lost rotor condition is identified in response to the detector timer exceeding a predetermined threshold period.

16. The method of claim 11 further comprising decreasing the override speed by a predetermined increment in response to each additional identification of the lost rotor condition.

17. The method of claim 16 further comprising disabling the motor in response to the override speed decreasing below a minimum operating speed.

18. The method of claim 17 further comprising determining the minimum operating speed based on (i) a refrigerant pressure at a condenser in fluid communication with the compressor and (ii) a refrigerant pressure at an evaporator in fluid communication with the compressor.

19. The method of claim 11 further comprising, while the requested speed is set to the override speed, increasing the override speed by a predetermined increment for each predetermined dwell time period during which the lost rotor condition is not identified.

20. The method of claim 19 further comprising, in response to the override speed reaching the speed demand, resuming generation of the requested speed based on the speed demand.

* * * * *